United States Patent Office 3,223,005
Patented Dec. 14, 1965

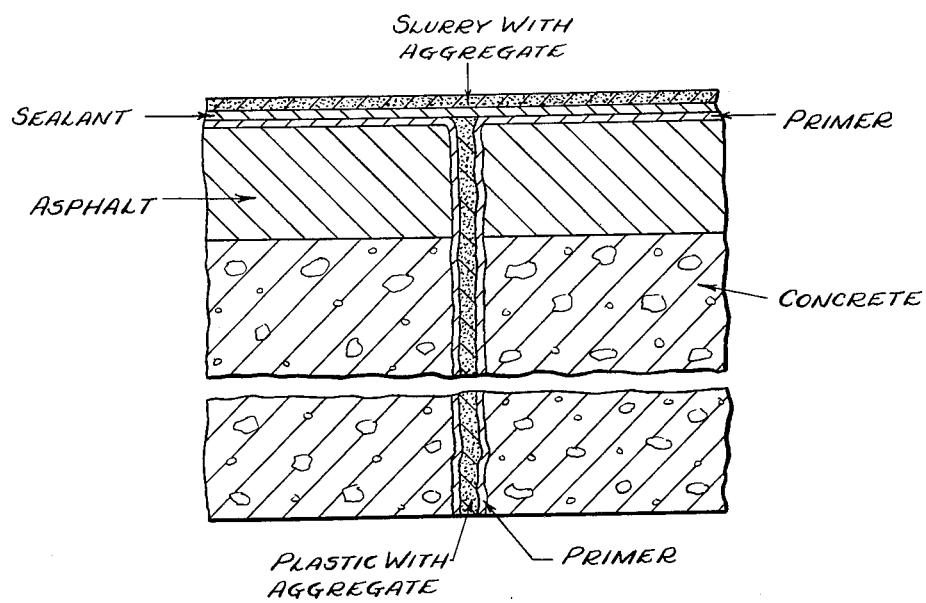

3,223,005
SEALING MEANS FOR CRACKED SURFACES
Harold V. Carlson, Hudson, Ohio, assignor to The Firestone Tire & Rubber Company, Akron, Ohio, a corporation of Ohio
Filed Mar. 8, 1961, Ser. No. 94,380
8 Claims. (Cl. 94—17)

This invention relates to a water- and fuel-resistant seal-coating composition and its uses. It has a variety of uses of which only a few are mentioned here.

It seals leaks in floors subject to motor vehicle traffic, particularly in parking decks, and bridges. Such decks are usually of concrete, but may be of asphalt. In concrete, these leaks are usually cracks. In a steel-reinforced structure, leakage is particularly objectionable because it rusts and thereby weakens the reinforcement.

It seals asphalt paving in parking lots, and other places where cars are parked, and is also used for sealing cracks, etc. in highways. Where there is leakage, and then freezing, damage results.

Where a non-slip covering is desired on a highway or elsewhere, it forms a surface sealant for the highway or the like and the non-slip aggregate can be applied directly to it so that it becomes embedded in it, or the aggregate can be mixed with the sealant before application.

The sealant is prepared by mixing a nitrile rubber with a resin composition. Usually, if inorganic additives (called "pigments" by rubber compounders) are to be used, they are first milled into the rubber. A rubber solvent is then added to produce a rubber cement, which may be pigmented. The resin composition is then incorporated in this, or the resin composition may first be dissolved in a solvent, or the rubber can be added to a solution of the resin composition, or the rubber and resin composition may be dissolved in a solvent simultaneously. The rubber contributes elasticity to the sealant which is desirable in bridging cracks, etc., and gives flexibility at low temperatures. The resin composition gives strength to the composition.

The ratio in which the materials are used will vary, depending upon the use to which the product is to be put. If too much rubber is used, the product gels and becomes livery. Any amount of resin composition from about 20 parts to 80 parts per 100 parts of rubber can be used.

The resin composition is at least largely a water- and fuel-resistant phenol-aldehyde resin. It contains at least substantially 50 percent and may be 100 percent a water- and fuel-resistant heat-reactive phenol-aldehyde resin. Up to 50 percent may be a non-heat-reactive phenol-aldehyde resin, or it may be a water- and fuel-resistant pitch, if a light color is not required. Pitches that can be used include coal tar pitches and water tar pitches, etc. The resin may include one or more non-heat reactive phenol-aldehyde resins. The phenol of the resin may be substituted with one or more methyl groups and the aldehyde may be formaldehyde, acetaldehyde, propionaldehyde or the equivalent. The heat-reactive resins of this type are made with acid catalyst and contain unreacted aldehyde (usually paraldehyde or hexamethylene tetramine) which reacts to set the resin when it is heated.

There are a wide variety of commercial phenol-aldehyde resins, some of which include extenders or modifiers. It is not practical to mention more than a few. Catalin Resin 8899[a] and Catalin Resin 8430[a] are thermosetting or heat-reactive phenolformaldehyde resins. Other heat-reactive phenol-aldehyde resins which can be used are such resins as Schenectady SP-12[b] and SP-126 Resins[c], Durez 11078[d] and 12687[d], and Bakelite CKR 1634[e], a product of Union Carbine Corporation.

Any nitrile rubber[f] that can be put into solution in a solvent in the high concentrations employed, can be used. A copolymer formed of 55 parts of butadiene and 45 parts of acrylonitrile is preferred. The nitrile rubber may be a terpolymer containing a relatively minor amount of carboxylic acid, for example, acrylic acid, or other monomer known to be contained in such elastomers. A preferred rubber is that known as Hycar 1072[g] which contains free carboxylic acid groups and has medium high oil resistance. Other commercial nitrile rubbers suitable for use are Hycar 1001[g], Hycar 1002[g], Hycar 1042[g], Paracril C[h], Paracril CV[h], Paracril B[h], Paracril BJ[h], Paracril AJ[h], Butaprene NXM[i], Butaprene NL[i] Butaprene NF[i], Chemigum N6[j], Chemigum N7[j], etc.

The following formula is illustrative:

| | Pounds |
|---|---|
| Nitrile rubber | 62 |
| Catalin Resin 8899 | 15 |
| Catalin Resin 8340 | 15 |
| 2-nitro propane | 62 |
| Sec.-butyl alcohol | 62 |
| Methyl ethyl ketone | 153 |

Colored modifications can be made by adding colored pigments.

The 2-nitro propane is used to provide wetting of the surface to be covered and aids in the release of solvent from the composition. Other wetting agents can be used, such as 1-nitro propane; and chlorinated derivatives of both compounds are quite satisfactory. Other types of wetting agents can be used. It is not essential to use any wetting agent, but better adhesion is assured by their use. A relatively low-boiling wetting agent hastens drying.

The alcohol is not essential, but it lowers the viscosity of the product and gives it greater stability by reducing the chance of livering. Ethyl alcohol can be

---

[a] See page 185 of Concise Chemical and Technical Dictionary, 1947, published by Chemical Publishing Company, Inc., Brooklyn, N.Y.
[b] See announcement of Schenectady Varnish Company, Inc., entitled Technical Data with the designation SP-12 Phenolic Resin, October 1958; also page 717 of Concise Chemical and Technical Dictionary, 1947, published by Chemical Publishing Company, Inc., Brooklyn, N.Y.
[c] See announcement of Schenectady Varnish Company, Inc., entitled SP-126 Phenolic Resin, dated 5-58 (May 1958).
[d] See Concise Chemical and Technical Dictionary, 1947, published by Chemical Publishing Company, Inc., Brooklyn, N.Y.
[e] See announcement of Bakelite Company, entitled Product Standards with "Product Designation" of "CKR-1634" (BR-14634), dated October 4, 1955; also page 717 of Concise Chemical and Technical Dictionary, 1947, published by Chemical Publishing Company, Inc., Brooklyn, N.Y.
[f] See definition on page 69 of Glossary of Terms Relating to Rubber and Rubber-Like Materials, copyrighted in 1956, published by American Society for Testing Materials, 1916 Race St., Philadelphia, Pa.
[g] See announcement of B. F. Goodrich Chemical Company entitled Properties of Hycar, May 15, 1958.
[h] See announcement of Naugatuck Chemical, Division of United States Rubber Company, Naugatuck, Connecticut, dated February 20, 1954, entitled Paracril Nitrile Rubbers.
[i] See announcement by Firestone Plastics Company and Xylos Rubber Company, divisions of The Firestone Tire and Rubber Company, entitled Nitrile Rubbers, dated August 10, 1958.
[j] See announcement of The Goodyear Tire & Rubber Company, Inc., entitled Chemgum Rubber, dated October 1949.

used. Also, alcohol increases the solubility of the resin composition.

A ketone solvent is preferred. Acetone can be used, but it dries too quickly in the hands of most workmen to allow thorough spreading before the composition webs. Methyl isobutyl ketone dries more slowly than methyl ethyl ketone. Mixtures of different proportions of the different solvents can be used to provide a desired drying rate.

A somewhat different formulation for a light gray sealant follows:

|                      | Pounds | Ounces |
|----------------------|--------|--------|
| Nitrile Rubber       | 55     | 8      |
| Titanium Dioxide     | 11     | 10     |
| E.P.C. Carbon Black  | 0      | 1      |
| Catalin Resin 8430   | 13     | 10     |
| Catalin Resin 8899   | 13     | 10     |
| 2-Nitro Propane      | 55     | 8      |
| Sec.-Butyl Alcohol   | 55     | 8      |
| Methyl Ethyl Ketone  | 172    | 1      |

The two pigments are milled into the rubber and it is batched off into small squares. The wetting agent, alcohol and ketone are put in a mixer. The resins are added to the mixer with stirring, and then the milled rubber stock, and the mixture is stirred until the resin and rubber are homogeneously dispsersed in the liquids.

As an example of the use of pitch, there may be added to the foregoing formula 8 pounds and 4 ounces of coal tar pitch with a float test at 50° C. of 150 to 200 sec. (A.S.T.M. D139–49.)

Sealant coats prepared from such compositions are tough, rubbery, and resistant to fuel and oil spillage, as well as water. They set quickly and are not affected by rain occurring immediately after application provided a low-boiling solvent is used in the sealant.

The invention will be further described in connection with the accompanying drawing which is a section through a cracked portion of a concrete floor with an asphalt surface. Although the drawing indicates that the seal is composed of layers, these merely indicate the steps of forming the seal and aside from the aggregate added, the sealant composition is ordinarily uniform throughout, the various layers being unitarily blended.

First, the surface must be essentially free of all dust, dirt, grease, oil, wax, paint or other foreign matter and loose material. Asphalt surfaces should be sufficiently oxidized to be free of oil before being treated. If necessary, the surface may be first washed with detergent or hydrochloric acid or other cleansing agent, and then thoroughly washed with water to insure removal of all oil and foreign matter. It must be thoroughly dry before applying the sealant.

The surfaces of the crack and the surface of the floor adjoining the crack are first coated with a primer made by thinning the rubber-resin mixture with a ketone or other solvent. This primer can be poured into the crack, and is preferably poured through the crack if the crack goes through the floor. Then about one-third to equal parts by volume of silica sand or the like is added to the uncut rubber-resin mix to form a viscous mass or slurry that is brushed or troweled into the crack until the crack is filled. The nature and amount of such aggregate are not critical. The amount will depend upon the amount of solvent used, the method of application, etc. The filled crack and adjoining surface are then covered with a coat of sealant. A slurry of sand (or other non-skid aggregate) and sealant can be applied to this to make a non-skid surface for a floor, highway, or the like.

Alternatively, a non-skid surface can be obtained by merely sprinkling the non-skid aggregate on the exposed surface of the sealant before the solvent has evaporated. If desired, this aggregate can be covered with another application of the solvent.

On a concrete pavement, where no large cracks have appeared, the sealant is applied by first applying primer.

A volume of sand or other aggregate, usually up to about the volume of the sealant, is added to any one or more coats of the sealant. The treatment is the same for an asphalt surface, except that no primer is required.

Coverage of one square yard of pavement surface with about 0.1 gallon of sealant of one of the above formulae without added sand, gives good coverage. With added sand, up to 0.2 gallon of sealant is required. The sealant may be applied with a long-handled brush or squeegee or other suitable means. If sand or other aggregate is to be sprinkled over the exposed surface of the sealant, and none is mixed with the sealant, the amount of sealant used is preferably increased to 0.15 gallon per square yard.

Where more than one coating is applied, it is desirable to allow the first coating to set up until it is free of tack before applying another coat. Any aggregate applied to the surface should be applied immediately while the surface is tacky. No heating is required. The sealant dries rapidly particularly in warm weather. Rain is not detrimental after the sealant has been applied. In order to permit thorough set-up on a garage floor, for example, before use, it is desirable to exclude parking traffic from the coated area for twenty-four hours after application of the finish coat. Moving traffic may be permitted two or three hours after application.

The term "nitrile rubber" is used herein to refer to any elastomeric copolymer of butadiene and acrylonitrile or any terpolymer composed chiefly of butadiene and acrylonitrile.

Modifications in the formulation and application will suggest themselves to persons skilled in the art. The invention is covered in the claims which follow.

What I claim is:

1. The method of treating a crack in a concrete surface, using a sealant ketone dispersion the organic solids content of which consists of nitrile rubber and water- and fuel-resistant resin composition, the resin composition being substantially 20 to 80 parts by weight per 100 parts of the rubber and containing at least substantially 50 percent by weight of heat-reactive phenol-aldehyde resin with the balance selected from the group consisting of phenol-aldehyde resins, coal-tar pitches and water-tar pitches, which method comprises first covering the surfaces of the crack and the adjoining surface area with a primer which is such a dispersion cut with solvent, filling the crack with a slurry of such dispersion as defined, and a substantial amount of sand up to a volume substantially equal to the volume of the sealant dispersion, and then covering the filled crack and adjoining surface area with dispersion, as defined, allowing evaporation of substantially all solvent from each application before making a subsequent application.

2. The process of claim 1 in which sealant and a non-slip aggregate are subsequently applied to the exposed surface after the evaporation of substantially all solvent therefrom.

3. A concrete surface, having a crack therein, the surfaces of the crack and the adjoining area being covered with a primer coat of nitrile rubber and water- and fuel-resistant resin composition, the amount of the resin composition being substantially 20 to 80 parts by weight per 100 parts of the rubber and containing at least substantially 50 percent by weight of heat-reactive phenol-aldehyde resin with the balance selected from the group consisting of phenol-aldehyde resins, coal-tar pitches and water-tar pitches, with the balance of the crack filled with a mixture of nitrile rubber and resin composition, as defined, admixed with sand, the surface of the crack and the adjoining area being covered with a mixture of nitrile rubber and resin composition, as defined.

4. The treated cracked surface of claim 3 having a non-skid aggregate in the finish surface.

5. The method of treating a crack in an asphalt surface, using a sealant ketone dispersion the organic solids content of which consists of nitrile rubber and water- and fuel-resistant resin composition, the resin composition being substantially 20 to 80 parts by weight per 100 parts of the rubber and containing at least substantially 50 percent by weight of heat-reactive phenol-aldehyde resin with the balance selected from the group consisting of phenol-aldehyde resins, coal tar pitches, water-tar pitches, filling the crack with a slurry of a dispersion, as defined, and a substantial amount of sand mixed therewith up to a volume substantially equal to the volume of the sealant dispersion, and then covering the filled crack and adjoining area with said sealant dispersion, allowing evaporation of substantially all solvent from each application before making a subsequent application.

6. The process of claim 5 in which sealant and a non-slip aggregate are subsequently applied to the exposed surface after the evaporation of substantially all solvent therefrom.

7. An asphalt surface having a crack therein, with the crack filled with a mixture of nitrile rubber and water- and fuel-resistant resin composition, the amount of the resin composition being substantially 20 to 80 parts by weight per 100 parts of the rubber and containing at least substantially 50 percent by weight of heat-reactive phenol-aldehyde resin with the balance selected from the class of materials consisting of phenol-aldehyde resins and coal-tar and water-tar pitches, the surface of the crack and the adjoining area being covered with a mixture of nitrile rubber and resin composition, as defined.

8. The treated cracked surface of claim 7 having a non-skid aggregate in the finish surface.

References Cited by the Examiner

UNITED STATES PATENTS

| | | | |
|---|---|---|---|
| 2,270,959 | 1/1942 | Murke | 260—43 |
| 2,459,739 | 1/1949 | Groton | 260—43 |
| 2,605,248 | 7/1952 | Fisk | 260—43 |
| 2,623,026 | 12/1952 | Bagley | 260—27 |
| 2,634,250 | 4/1953 | Kiley | 260—43 |
| 2,658,015 | 11/1953 | Williams | 260—43 |
| 2,672,793 | 3/1954 | Rowe | 94—3 |
| 2,684,351 | 7/1954 | Williams | 260—43 |
| 2,813,843 | 11/1957 | Shepard | 260—43 |
| 2,916,471 | 12/1959 | Rosahl | 260—43 |
| 2,925,831 | 2/1960 | Welty | 138—80 |

OTHER REFERENCES

Encyclopedia of Chemical Technology, by Interscience Publishing Co., New York, 1953, pages 338 and 339, vol. 10.

Engineering Properties and Applications of Plastics, by Kinney, 1957, page 158, TA455, P5k5.

CHARLES E. O'CONNELL, *Primary Examiner.*

JACOB L. NACKENOFF, *Examiner.*

Dedication 3,223,005.—*Harold V. Carlson*, Hudson, Ohio. SEALING MEANS FOR CRACKED SURFACES. Patent dated Dec. 14, 1965. Dedication filed May 18, 1976, by the assignee, *Firestone Tire & Rubber Company*.

Hereby dedicates to the People of the United States the remaining term of said patent.

[*Official Gazette July 6, 1976.*]